(12) United States Patent
Jaeger et al.

(10) Patent No.: US 8,376,683 B2
(45) Date of Patent: *Feb. 19, 2013

(54) LOW CENTER OF GRAVITY CARRIER

(75) Inventors: David Jaeger, Oregon, OH (US); Ronald B Nespor, Greenville, PA (US)

(73) Assignee: Miller Industrial Towing Equipment Inc, Ooltewah, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/282,077

(22) Filed: Oct. 26, 2011

(65) Prior Publication Data

US 2012/0039695 A1    Feb. 16, 2012

Related U.S. Application Data

(63) Continuation of application No. 12/129,917, filed on May 30, 2008, now Pat. No. 8,070,411.

(51) Int. Cl.
*B60P 1/16* (2006.01)

(52) U.S. Cl. ...................... 414/477; 280/6.15

(58) Field of Classification Search ............... 280/6.15, 280/6.151; 414/477, 478, 480, 494, 538
See application file for complete search history.

(56) References Cited

U.S. PATENT DOCUMENTS

| | | | | |
|---|---|---|---|---|
| 3,666,125 A * | 5/1972 | Gano et al. | | 414/718 |
| 4,616,879 A * | 10/1986 | Booher | | 298/10 |
| 4,704,062 A * | 11/1987 | Hale | | 414/494 |
| 4,750,856 A * | 6/1988 | Lapiolahti | | 414/563 |
| 5,061,147 A * | 10/1991 | Nespor | | 414/563 |
| 5,871,328 A * | 2/1999 | Pinkston | | 414/477 |

* cited by examiner

*Primary Examiner* — James Keenan
(74) *Attorney, Agent, or Firm* — Michael P. Mazza, LLC

(57) ABSTRACT

A carrier having a platform or deck mounted on a subframe tiltable relative to the vehicle chassis. The platform is preferably slidable relative to the subframe. Using Super Single rear wheels and an airbag suspension, for example, sufficient clearance is provided such that the subframe is preferably located between the vehicle chassis frame and the rear wheels. The resulting carrier has a platform with a height lower than that of previous carriers, providing it with a lower center of gravity, enabling a reduction in load angle and an increase in payload height.

19 Claims, 10 Drawing Sheets

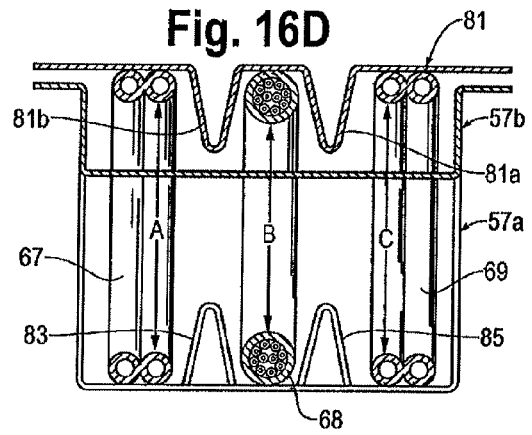
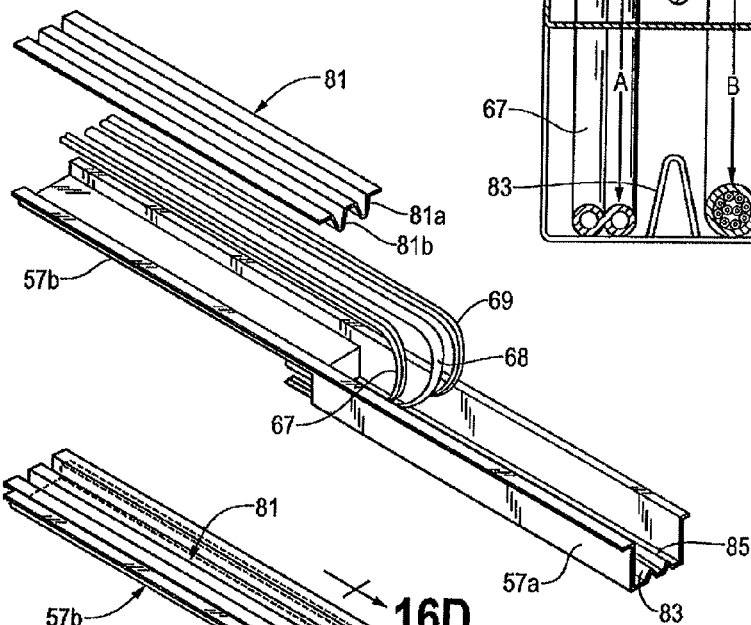
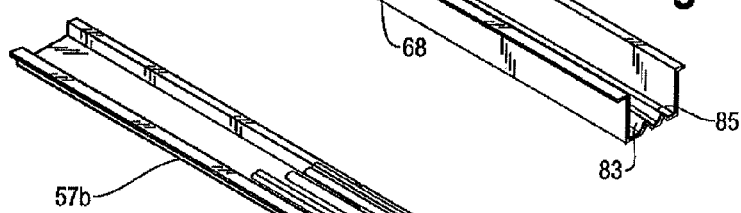
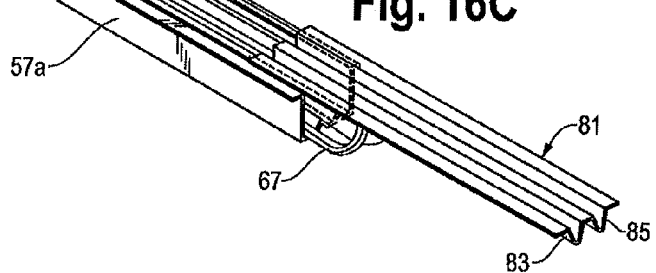

LOW CENTER OF GRAVITY CARRIER

RELATED PATENTS

This application is a continuation of U.S. Ser. No. 12/129, 917 filed May 30, 2008 ("the parent case"), for which U.S. Pat. No. 8,070,411 issued on Dec. 6, 2011 for claims 1-5, 8-16, 19 and 20. This continuation application contains no new matter.

U.S. Pat. No. 5,061,147 filed Oct. 29, 1991 and titled "Vehicle Carrier with Wheel Lift" are hereby incorporated by reference in their entirety into this disclosure.

BACKGROUND OF THE INVENTION

The present invention generally relates to tilting bed carriers. More specifically, the invention is directed to the art of tilting bed carriers using a tilting platform having a low center of gravity and relatively small loading angle.

Various carriers, including car carriers as well as industrial carriers (for carrying forklifts, tractors and machines, etc.), are known, as shown in U.S. Pat. No. 4,750,856 ('856 patent) to Lapiolahti and U.S. Pat. No. 5,061,147 ('147 patent) to Nespor. These patents disclose a bed carrier or tiltable platform mounted on a truck chassis which moves from a horizontal position on the truck frame to a tilted position in which the rear end of the bed or platform engages the ground. The tiltable platform of the '856 patent is attached to the frame of a truck chassis, and a hydraulic cylinder tilts the platform rearwardly from the horizontal position to an inclined position by simultaneous upward and rearward movement of the front end of the bed and downward and rearward movement of the rear end of the bed, to enable the loading of a disabled vehicle. The carrier platform of the '147 patent is situated on a subframe with parallel beams that, in a generally similar fashion, support independent sliding and tilting movement of the platform.

Carriers, such as those disclosed in the '856 and '147 patents, utilize a tiltable platform with main longitudinal rails or beams mounted above the truck frame of a dual rear wheel chassis. Conventional commercial truck chassis have been equipped with dual rear wheels in single and tandem axle configurations. Recently, another truck chassis rear wheel configuration has been developed and commercialized, known as a "Super Single" wheel and tire system. The Super Single wheel system employs one wide wheel and tire on each end of a truck axle, as compared to two narrow wheels and tires on each end of dual-wheeled truck axle. Each style of wheel configuration has advantages and disadvantages. The Super Single wheel configuration is less expensive and provides better fuel economy than dual rear wheel configurations. Dual rear wheel configurations provide redundancy in the event of a single flat tire.

Dual rear-wheeled chassis have approximately 7 inches of clear space between the tires and the truck frame, whereas the Super Single wheel configuration provides about 12 inches of such clearance. It was discovered that using a Super Single wheel configuration which provides this additional 5 inches of space between the rear wheels and truck frame, together with the use of air bag rear suspensions, enables the location of a carrier's longitudinal slide or platform beams beside the truck frame, and adjacent the rear wheels. This lowers the subframe and sliding platform about 6 inches relative to the top of the truck frame, as compared to conventional carriers.

Lowering the subframe and sliding platform about 6 inches has several advantages compared to conventional carriers with slide beams located above the truck frame. Typical commercial truck chassis have truck frame heights ranging from 36-44 inches relative to the ground, depending on the size of the truck frame and the type of rear suspension used. Traditional carriers have deck heights about 12-13 inches above the truck frame, which equates to conventional deck heights of about 48-57 inches above the ground. A lower tiltable platform height translates into a lower center of gravity, since the deck height relative to the ground is now in the range of about 42-51 inches, which provides improved truck handling. More available payload height is also provided. A lower platform height also means that the tiltable platform will have a lower load angle relative to the ground, which can facilitate loading (e.g., a large counterweight on a forklift can be more easily loaded, etc.).

SUMMARY OF THE INVENTION

The objects mentioned above, as well as other objects are solved by the present invention, which overcomes disadvantages of prior carriers, while providing new advantages not believed associated with conventional carriers.

In a preferred embodiment, a carrier having a vehicle chassis and rear wheels supported by an airbag suspension is provided. The carrier includes a subframe with slide rails; the slide rails may be interposed between frame rails of the vehicle chassis and the rear wheels. The subframe is preferably tiltable relative to the vehicle chassis. A platform may be mounted to the subframe. The interposition of the subframe between the frame rails of the vehicle chassis and the rear wheels enables a lowered platform height, a carrier with a lower center of gravity (LCG carrier), and an increase in the payload height in comparison to conventional carriers in which the subframe is located above the frame rails.

Preferably, the subframe is located at about the same height above ground as the vehicle chassis. Preferably, the rear wheels are Super Single rear wheels, although it may be possible to design an LCG carrier using conventional rear wheels. In an alternative embodiment, the carrier may include rear tandem axles. Using the principles of the present invention, and using current industrial carriers as an example, the payload height may be increased by about 6 inches, for example, from that of a conventional carrier having subframe rails not located between the vehicle chassis and the rear wheels.

To provide maximum clearance for the subframe slide rails, it is preferred that the carrier utilize an airbag suspension although, particularly in the future, it is possible that this may not be strictly necessary. It was found that using the principles of the present invention, and with current industrial carriers, the load angle of the platform may be reduced from that of a traditional car carrier by about 2°, when using a 28-foot bed and a carrier with an airbag suspension.

Preferably, the platform is also slidable in a generally horizontal direction relative to the subframe. In a preferred embodiment, the subframe may be tiltable using a first set of hydraulic cylinders, and the platform may be slidable using a second set of hydraulic cylinders.

The carrier may employ a winch for facilitating loading of a disabled vehicle onto the platform. Oil for the winch, as well as electrical cable and/or pressurized air, may be supplied by hoses carried by one or more hose troughs; the hose troughs may preferably be located to the rear of the carrier. A hose trough may include two or more separate bays, and each bay may be permitted to carry a separate hose, for example.

A method of using a carrier for towing a disabled vehicle also forms part of the present invention. The carrier includes a vehicle chassis, rear wheels and an airbag suspension. In one preferred method, a subframe is provided with rails located between frame rails of the vehicle chassis and the rear wheels. The subframe is preferably tiltable relative to the vehicle chassis. At least one platform may be mounted to the subframe and slidable relative to the subframe. The subframe may be rotated clockwise, when viewed from the side, using hydraulic cylinders to provide the platform in an inclined position. The platform may be slid rearwardly relative to the subframe until a rear of the platform contacts the ground. A disabled vehicle may then be moved onto the platform, and secured to the platform for transport. The platform may then be slid forward, relative to the subframe, for transport, and the subframe and platform may be rotated counterclockwise back to the initial horizontal position.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Payload height" means the vertical distance between the carrier deck and the legal limit of the height above ground. (Federal regulations currently limit the height above ground of a load being transported to 13-feet, 6-inches). As an example, in the specific embodiment of the present invention disclosed here, the payload height can be increased by about 6 inches.

"Load angle" means the angle between horizontal or ground, on the one hand, and the deck surface when the deck is inclined, on the other.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 16A is an enlarged, exploded top and side perspective view of the hose trough with multiple bays shown in FIG. 15;

FIG. 16B is a view similar to FIG. 16A with the body plate in normal, retracted position;

FIG. 16C is a top and side perspective view of the preferred hose trough in an extended position; and FIG. 16D is a sectional view along reference line 16D-16D of FIG. 16B.

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
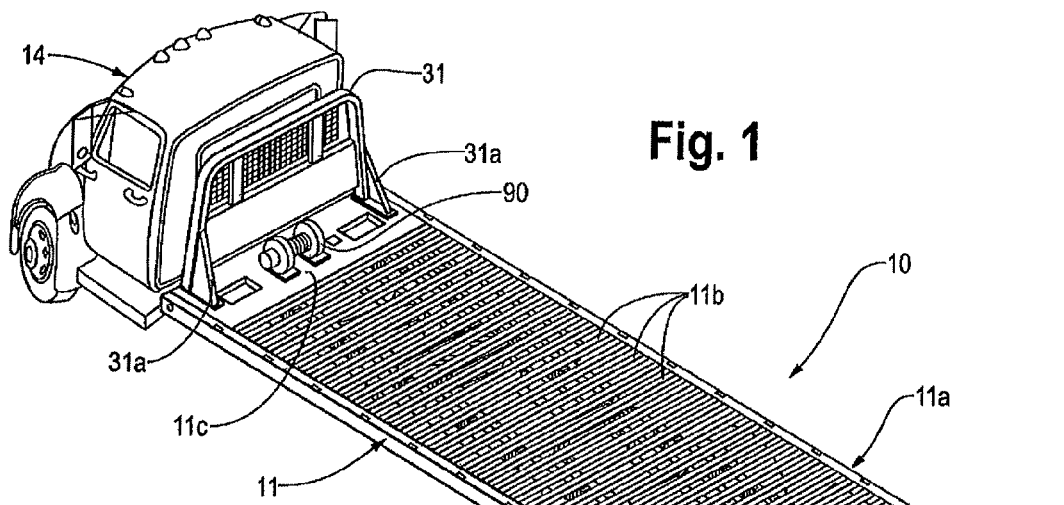
FIG. 1 is a top and side perspective view of a carrier according to a preferred embodiment of the invention.
Figure 2:
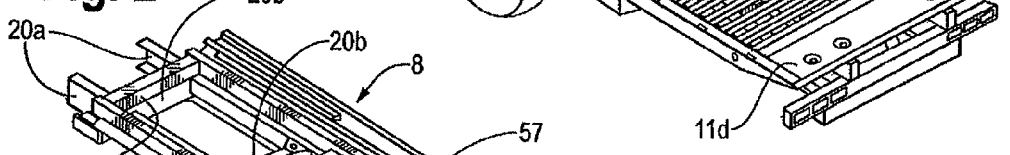
FIG. 2 is a top and side perspective view of the vehicle chassis, platform subframe and rear wheels of the embodiment shown in FIG. 1 (i.e., with the platform removed)
Figure 2A:
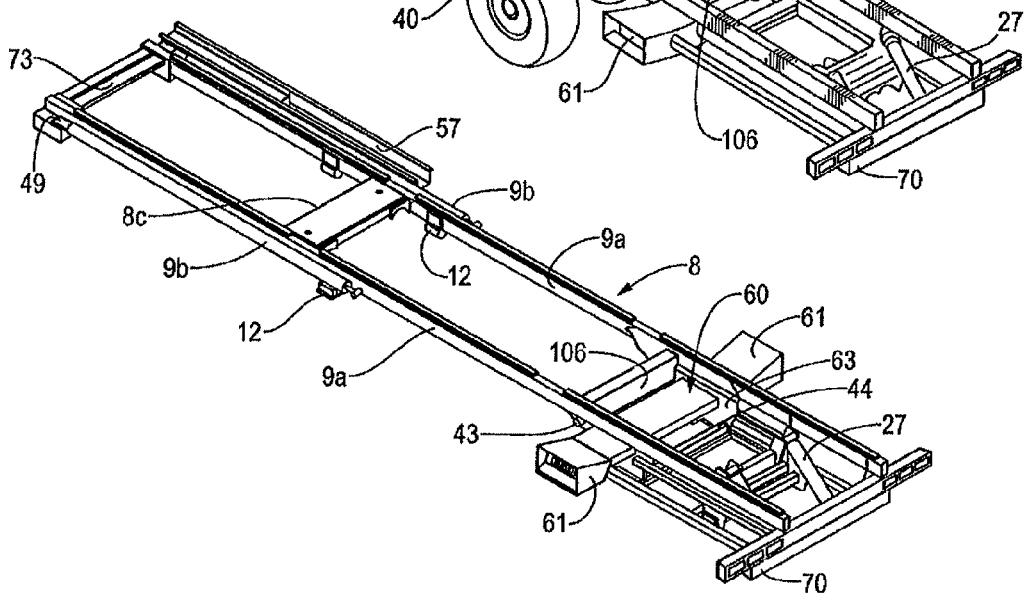
FIG. 2A is a top and side perspective view of the subframe of the embodiment shown in FIG. 1.

Referring first to FIGS. 1, 2 and 2A, a preferred embodiment of carrier 10 includes vehicle cab 14 pulling slidable and tiltable platform 11. Rear of the cab, cab protector bar 31 may be supported on platform 11 by weldments 31a on the platform. Platform 11 may be supported by subframe 8, which may be positioned adjacent to and attached to vehicle chassis 20 as explained below.

Referring to FIGS. 2-6, vehicle chassis 20 may include opposing longitudinal chassis rails 20a, supported by chassis crossmembers 20b. Super Single rear wheels 40 be mounted as shown. Subframe 8 may be positioned, in novel fashion, between rear wheels 40 and vehicle chassis rails 20a, enabling the subframe to be located nearer to the ground than previously possible.

Figure 3:
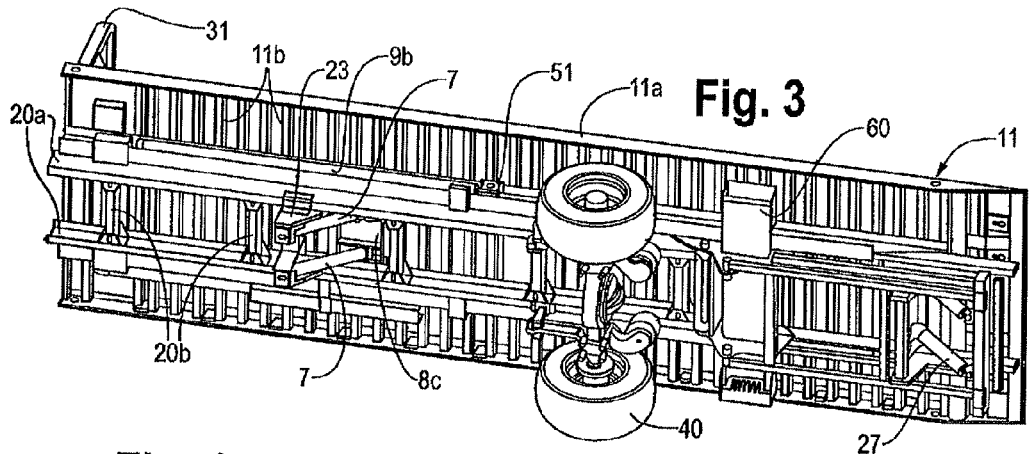
FIG. 3 is a side and bottom perspective view of the carrier, not including cab, shown in FIG. 1.
Figure 4:
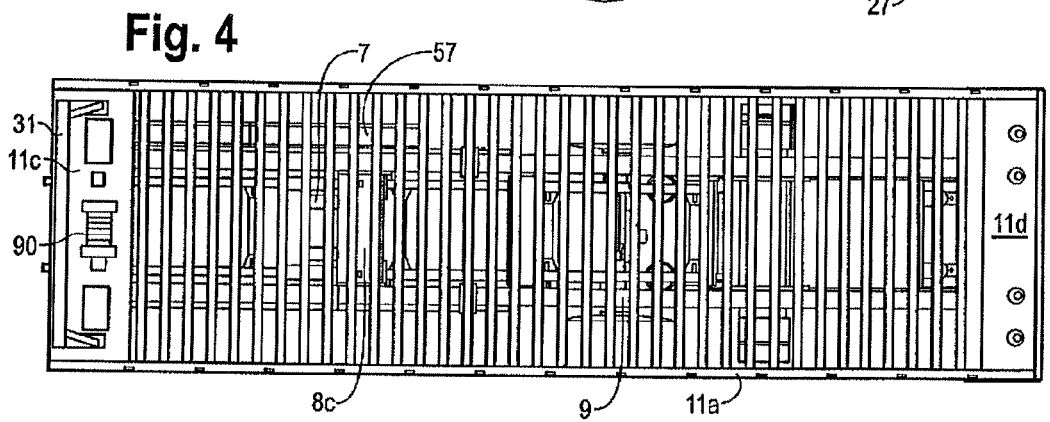
FIG. 4 is a top perspective view of the preferred carrier shown in FIG. 1.
Figure 6:
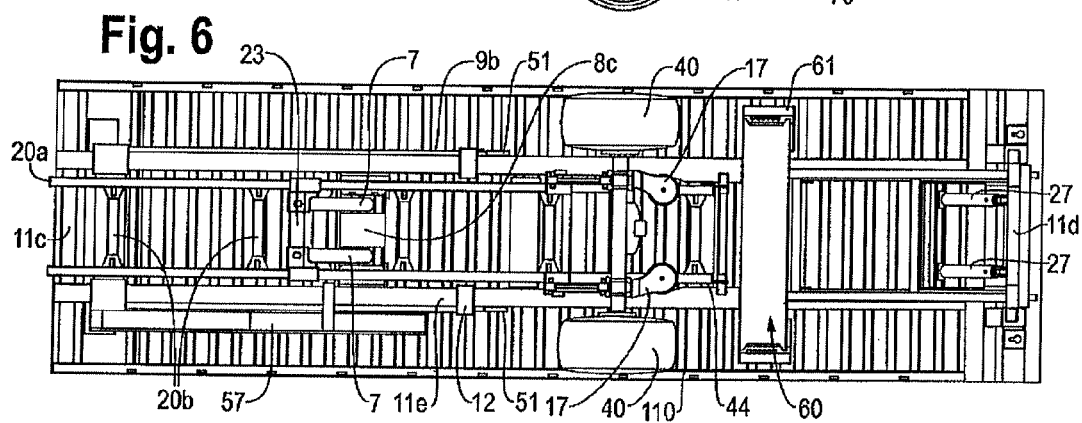
FIG. 6 is a bottom perspective view of the preferred carrier shown in FIG. 4.

Referring to FIGS. 3-4, platform 11 may include platform side rails 11a, platform cross-rails 11b, front and rear platform portions 11c, 11d, respectively, and longitudinal bed rails 11e (see FIG. 6).

Figure 8:
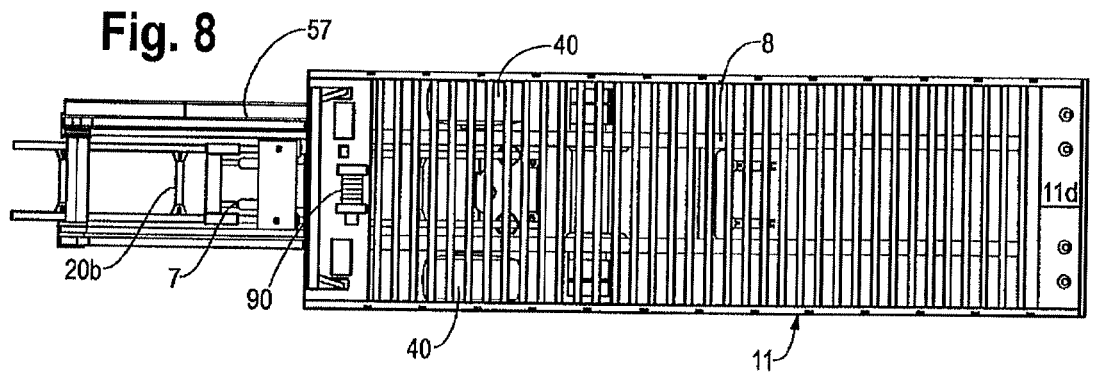
FIG. 8 is a top perspective view similar to FIG. 4, showing the platform subframe slid rearwardly along the chassis.
Figure 9:
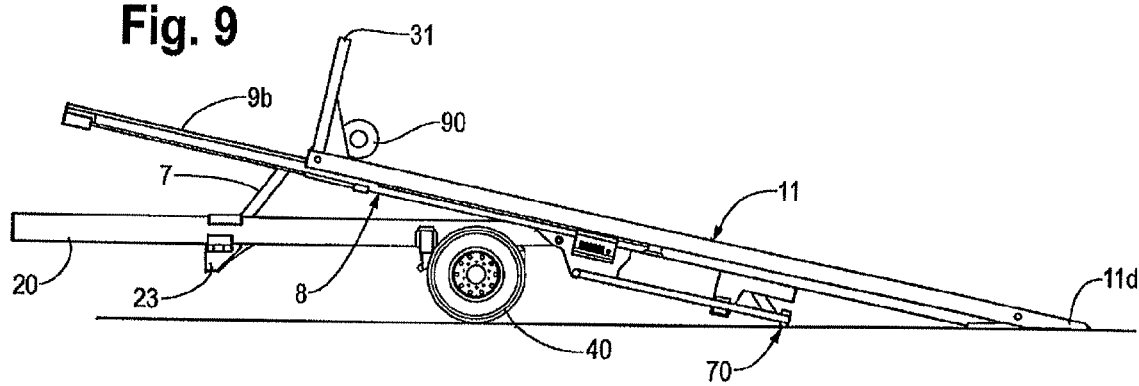
FIG. 9 is a side perspective view of FIG. 8.

Preferably, platform or bed 11 may be slidable relative to subframe 8, and may be tiltable relative to vehicle chassis 20, as now explained. When the carrier is not loaded, in a preferred embodiment the sliding and tilting functions may occur independently at different times, or simultaneously, at the operator's discretion. The sliding function will be discussed first. Referring first to FIGS. 2 and 2A, slideback cylinders 9b may be extended and retracted to actuate sliding movement of the bed relative to the subframe, as shown in FIGS. 8 and 9. (FIGS. 1, 4 and 8 are shown with the floor plate, a flat piece of steel forming the upper, work surface of the platform, removed to better show the top details.) Cylinders 9b may be rigidly attached at a forward end to the subframe (e.g., plate 49 of FIG. 2A), and at a rearward end to the bed (e.g., at a pinned connection such as slideback cylinder mounts 51 on the bed (FIGS. 3 and 6). When slideback cylinders 9b are fully extended, to counter their natural sagging tendency, they may be supported by slideback cylinder supports 12 (FIG. 2A).

Figure 2B:
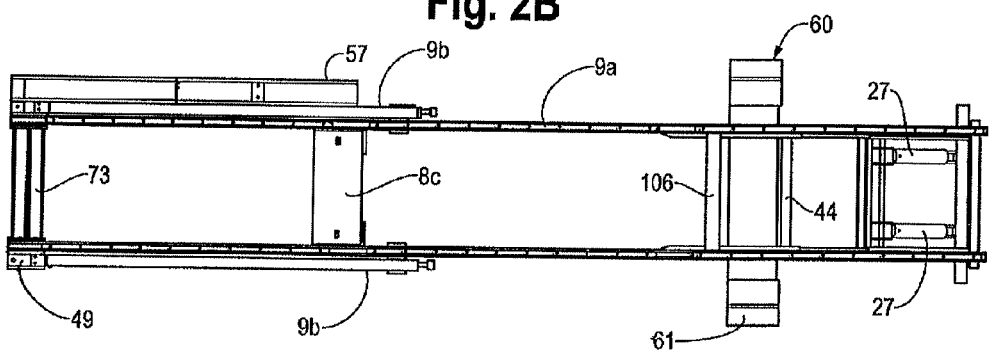
FIG. 2B is a top perspective view of the subframe of the embodiment shown in FIG. 1.
Figure 2C:
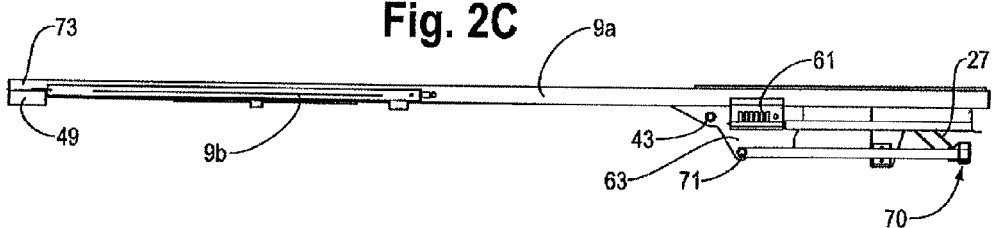
FIGS. 2C and 2D are left and right side perspective views, respectively, of the subframe shown in FIG. 2A.
Figure 2D:
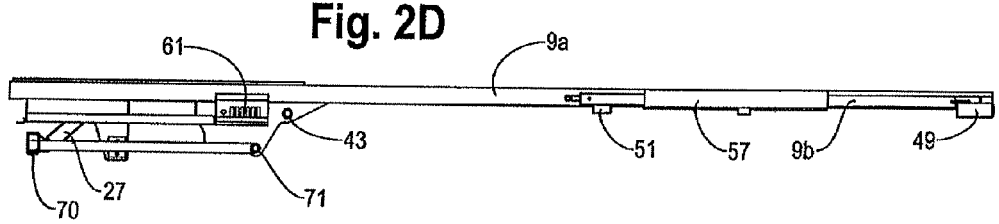
Figure 2E:
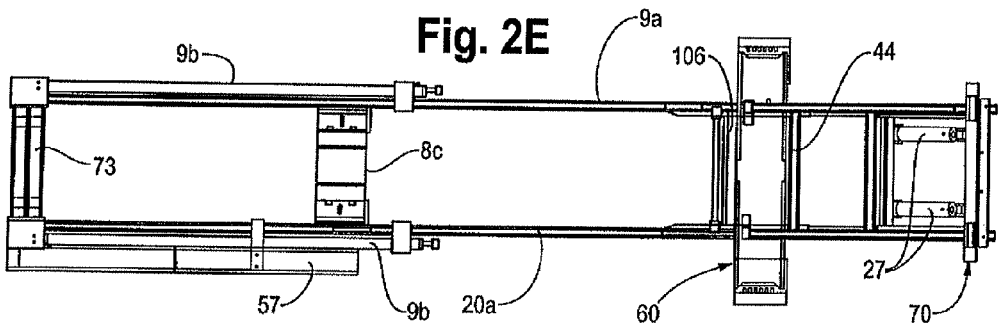
FIG. 2E is a bottom perspective view of the subframe shown in FIG. 2A.
Figure 2F:
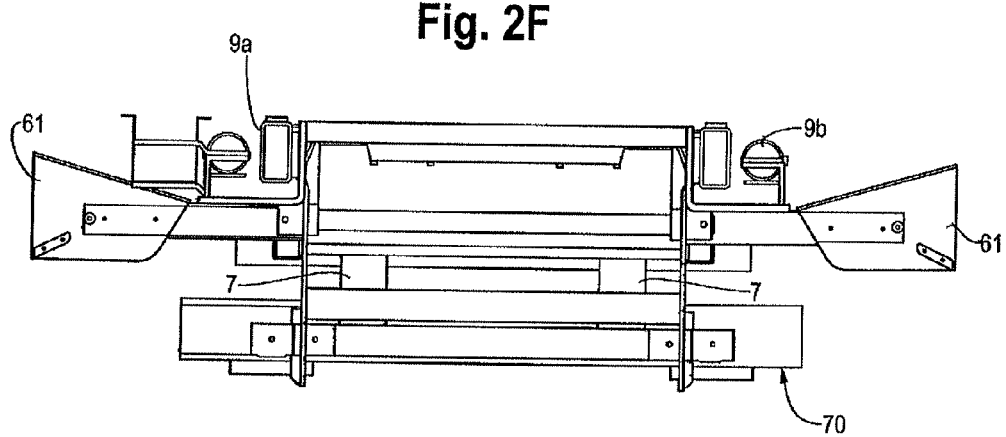
FIGS. 2F and 2G are front and rear perspective views, respectively, of the subframe shown in FIG. 2A.
Figure 2G:
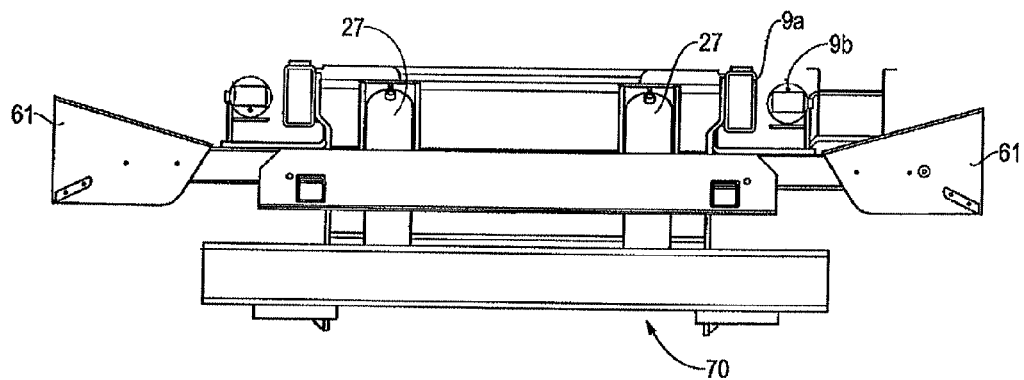

Referring now to FIGS. 2-6, 9 and 14, the tiltable function of the subframe, and thus the deck mounted to it, will now be described. Subframe 8 includes opposing subframe slide rails 9a, front subframe crossmember 73, and cylinder box 8c. Hinge plate crossmember 106 (FIGS. 2A and 2B) may be welded to the subframe. Subframe 8 may pivot about bushings 43 on hinge plate 63 (see FIGS. 2A, 2C and 14). Bushings 43 may be welded to hinge plate 63. Hinge plate 63 may be rigidly attached to subframe slide rails 9a, as shown in FIG. 2A, enabling the subframe to pivot relative to the truck chassis.

Tilt cylinders 7 may be extended to tilt the subframe and bed combination clockwise as shown in FIG. 9, and retracted to rotate the bed back counterclockwise to a horizontal position. Referring to FIGS. 3 and 6, the lower, forward end of the tilt cylinders may be pivotally attached to saddles 23, while the upper, rearward end of the tilt cylinders may be pivotally attached to cylinder box 8c of the subframe 8.

Referring to FIGS. 2 and 2A, a pair of control stations 61 may be attached to the subframe, such as by attachment to subframe crossplate 60. Control stations 61 may include opposing handles or control levers so that an operator may control various functions from either side of carrier 10, such as platform sliding, subframe tilting, winching, or the function of various devices which may be connected at the rear of the carrier, such as hydraulic stabilizers, wheel lifts, etc.

Figure 11A:
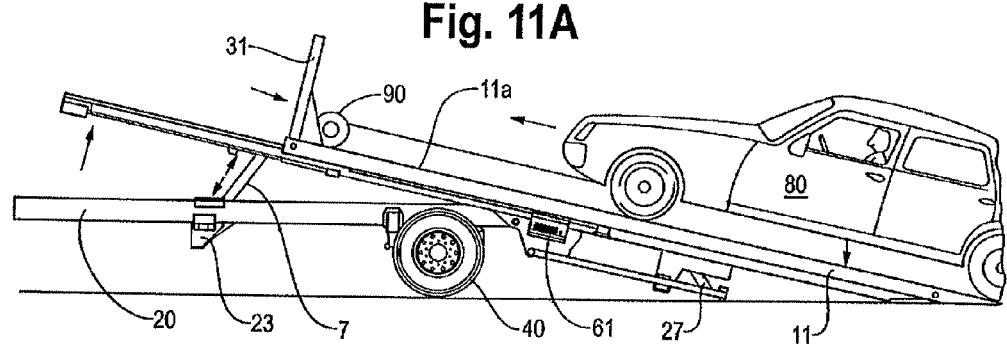
FIGS. 11A-11C are side perspective views showing a disabled vehicle being winched up the inclined platform (FIGS. 11A-11B) and then in the horizontal, stored position (FIG. 11C)
Figure 11B:
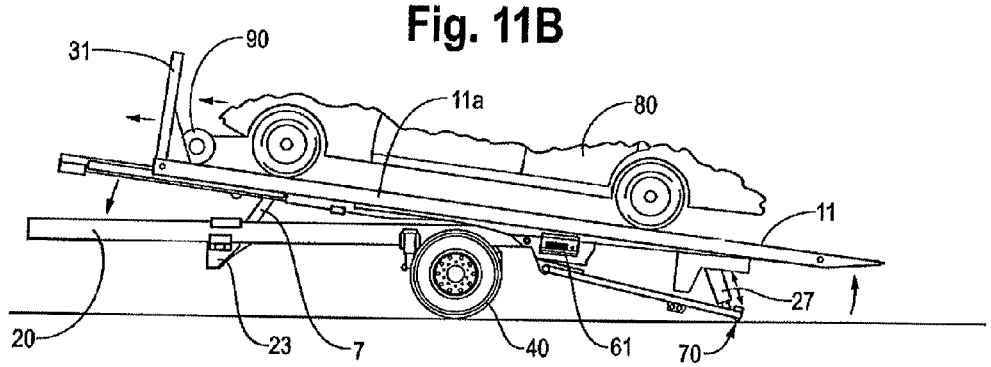
Figure 11C:
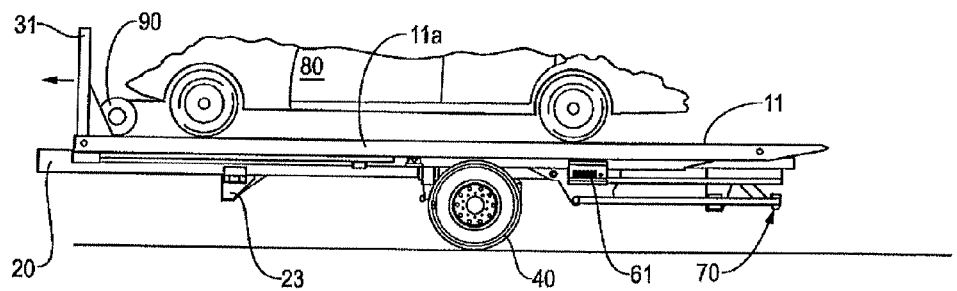

Referring to FIGS. 8-9 and 11A-11C, the appropriate sequence for loading the carrier is as follows. First, the subframe/deck combination is tilted using hydraulic tilt cylinders 7 until rear stabilizer 70 contacts the ground. Next, the deck is slid rearwardly, using hydraulic slideback cylinders 9b, down the incline relative to the subframe, until the rear portion 11d of the deck contacts the ground. Now, load 80, such as a disabled vehicle, may be driven or winched up the deck incline using winch 90, as shown in FIGS. 11A-11C. The load is then secured to the bed, using chains, straps and/or similar equipment. After securing the load on the deck, the deck is slid forward and up the incline, relative to the subframe, to its fully forward or retracted position. Finally, the subframe/deck combination is now rotated counterclockwise back to a horizontal position (FIG. 11C).

Figure 5:
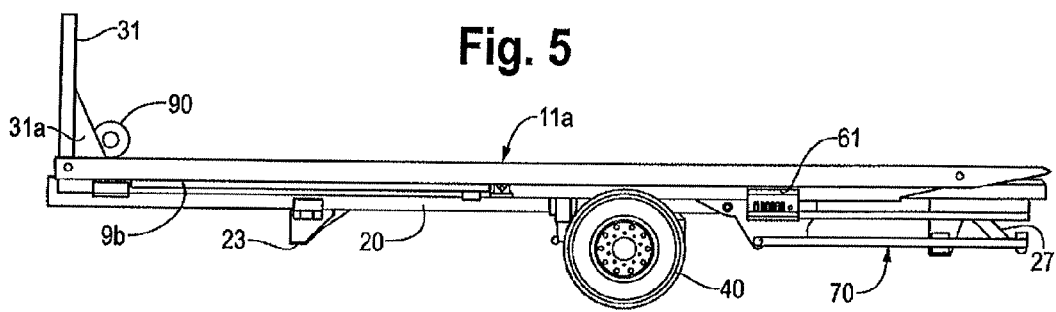
FIG. 5 is a side perspective view of the preferred carrier of FIG. 4.
Figure 7:
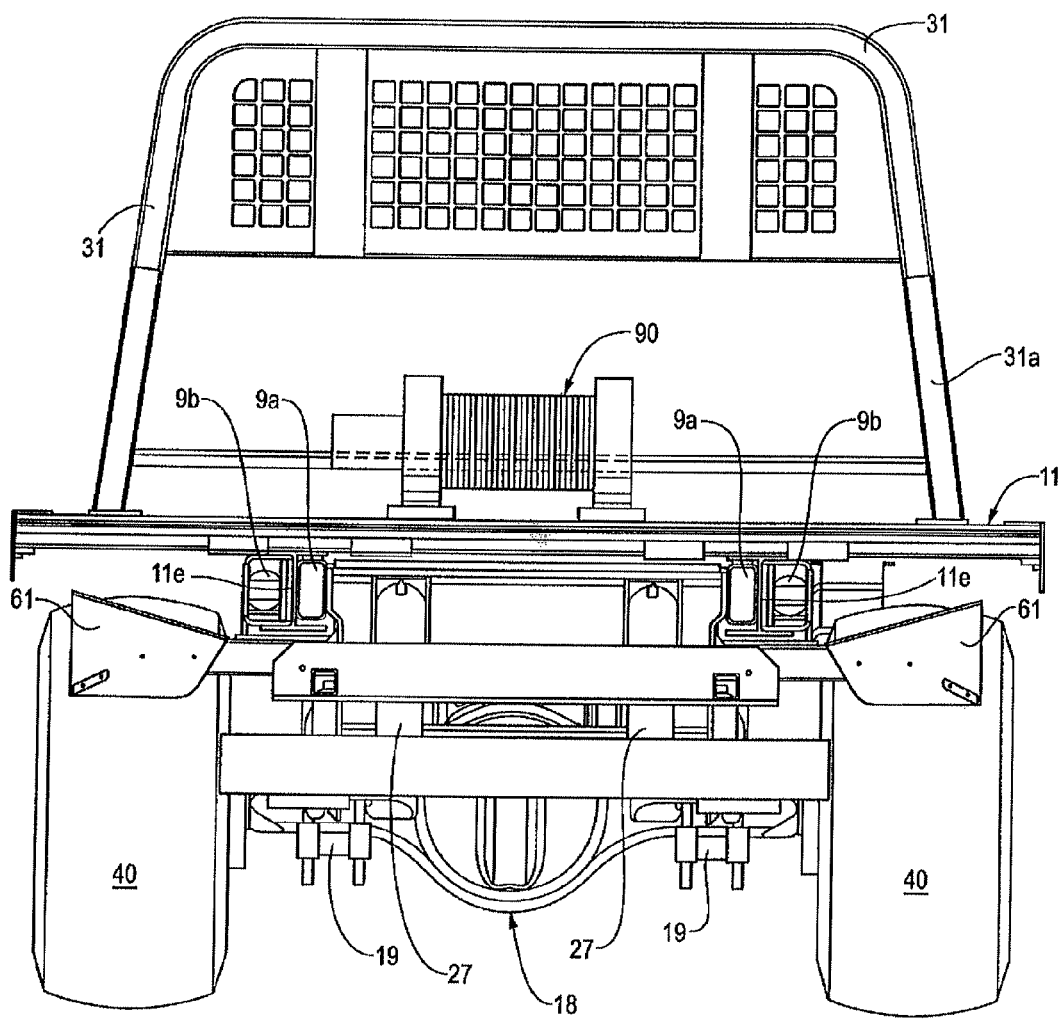
FIG. 7 is a rear, enlarged perspective view of the preferred carrier shown in FIG. 1.
Figure 10:
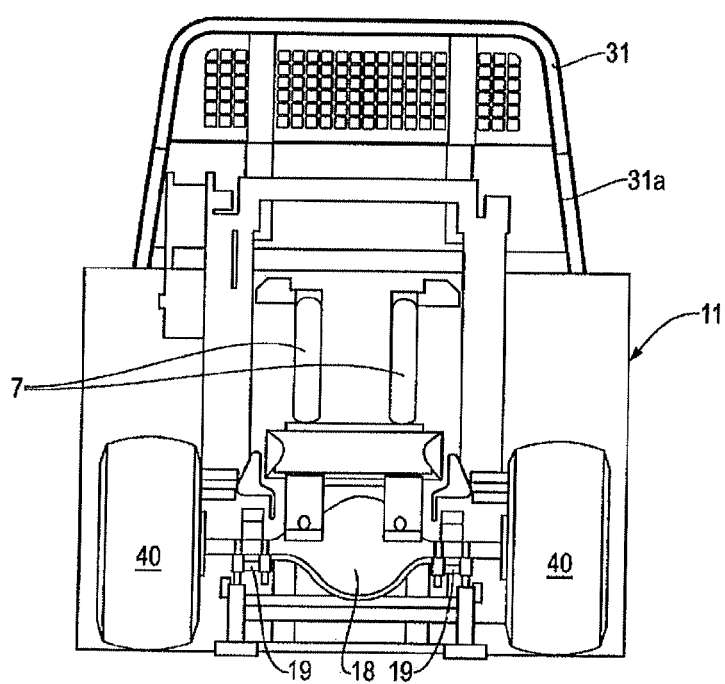
FIG. 10 is a front perspective view of the preferred carrier shown in FIGS. 1 and 7.
Figure 14:
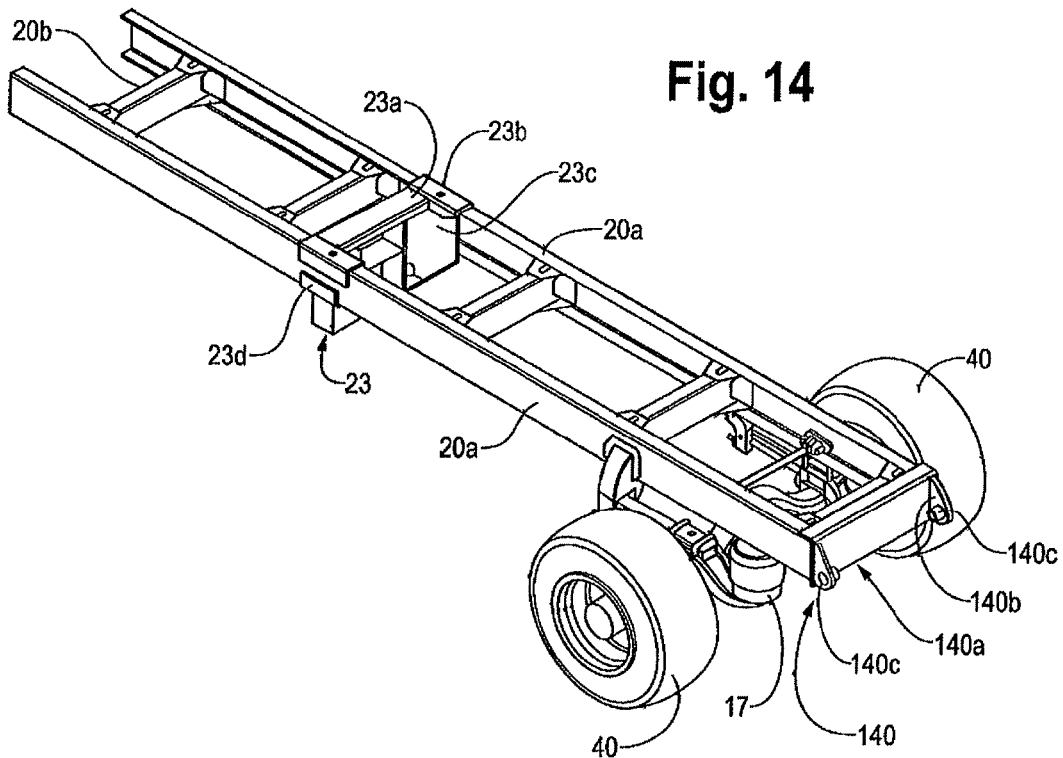
FIG. 14 is a top and side perspective view of the vehicle chassis of the preferred carrier.

Referring now to FIGS. 2, 3 and 5, it can be seen that subframe 8, while positioned between the vehicle chassis frame rails and the rear wheels, can also sit slightly above the frame rails of chassis 20, to allow enough room for low profile subframe crossmembers. Referring to FIGS. 6, 7 and 14, rear axle airbag suspension 17 is preferably employed. Differential housing 18 lies adjacent thereto. Referring to FIGS. 7 and 10, U-bolt axle shackle 19 may be used to hold the axle to the suspension. With prior carriers (e.g., as shown in the '147 patent), the subframe slide rails were required to sit completely above the chassis frame. However, because the current invention uses a single-wheeled chassis, together with a rear axle airbag suspension, approximately 12 inches of clear space is provided between rear wheels 40 and truck frame rails 20a, so that there is room to position subframe rails 9a parallel to vehicle chassis rails 20a, and interposed between chassis rails 20a and rear wheels 40. (Conventional leafspring suspensions are mounted on the side of the truck frame, and would interfere with the location of bed rails 11e.) This additional five inches of space between the rear tires and truck frame thus provided, over conventional assemblies, enables positioning of a carrier's longitudinal slide beams adjacent the side of the truck frame to lower the subframe and sliding platform approximately 6 inches relative to the top of the truck frame. This enables the platform height to be lowered at least 6 inches below its previous height relative to ground, as compared to the '147 patent, for example.

Figure 12:
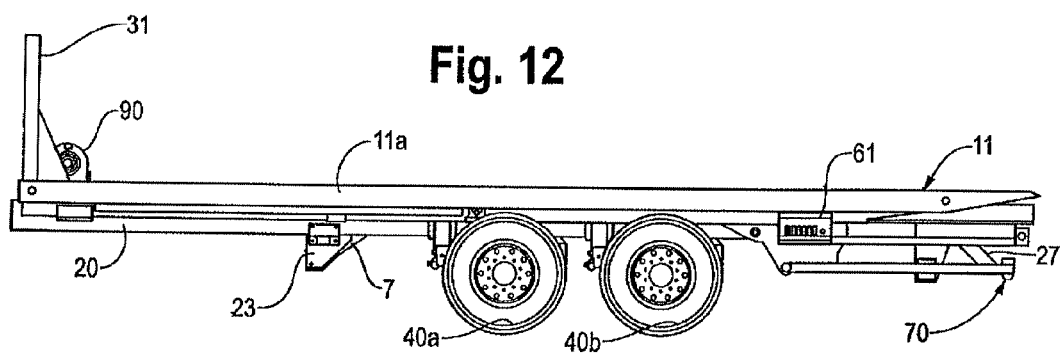
FIG. 12 is a side perspective view similar to FIG. 4, showing a tandem axle carrier with dual pairs of rear wheels.
Figure 13:
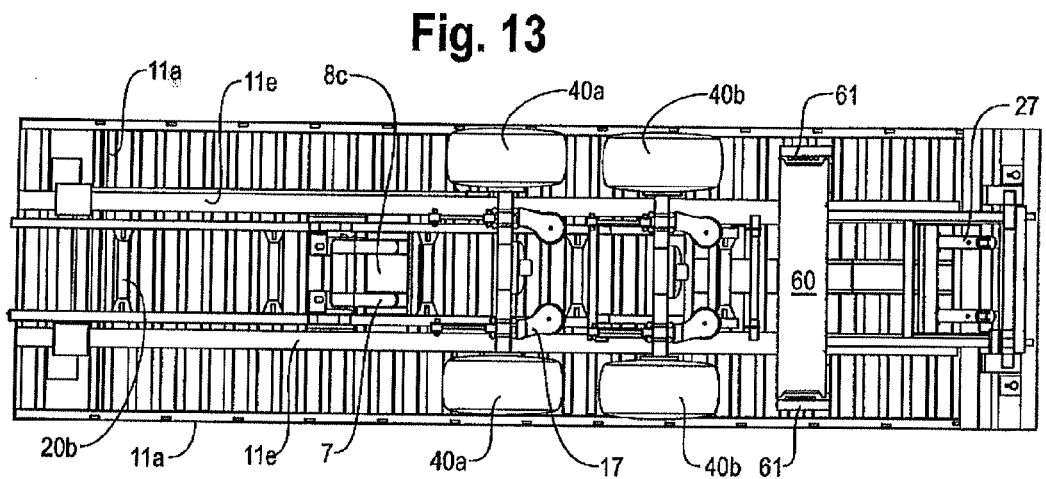
FIG. 13 is a bottom perspective view of the tandem axle carrier shown in FIG. 12.

Referring to FIGS. 12-13, a tandem rear-axle carrier with dual pairs of rear wheels 40a and 40b is shown. This embodiment is similar to the embodiment shown in the earlier figures, with the exception that tandem rear wheels are employed with corresponding tandem suspensions.

Referring to FIG. 14, in a preferred embodiment, chassis hinge weldment 140 may be welded rigidly to vehicle chassis frame rails 20a. Hinge weldment 140 may include: hinge angle 140A, spanning the chassis frame rails; opposing hinge plates 140B welded to hinge angle 140A; and hinge bushings 140C, each housed in hinge plates 140B. The chassis hinge weldment is the means by which the subframe pivotally attaches to the chassis. Also, the cylinder box 8c is the means by which the tilt cylinders pivotally attach to the subframe. The chassis hinge and the subframe hinge are concentrically mated.

Still referring to FIG. 14, tilt cylinder saddle 23 is the means by which tilt cylinders 7 attach to the chassis. Subframe 8 (hinge plate 63 and bushings 43 shown in FIG. 2A) pivots about the vehicle chassis on chassis hinge weldment 140, which functions as a common concentric pivot point. Elements 23a-23d combine to form a preferred saddle 23 for mounting tilt cylinders 7: cross plate 23a in the saddle weldment; reinforcement channels 23b for the saddle; sideplate 23c of the saddle; and reinforcement gussets 23d, which aid in attaching the saddle to the truckframe).

Figure 15:
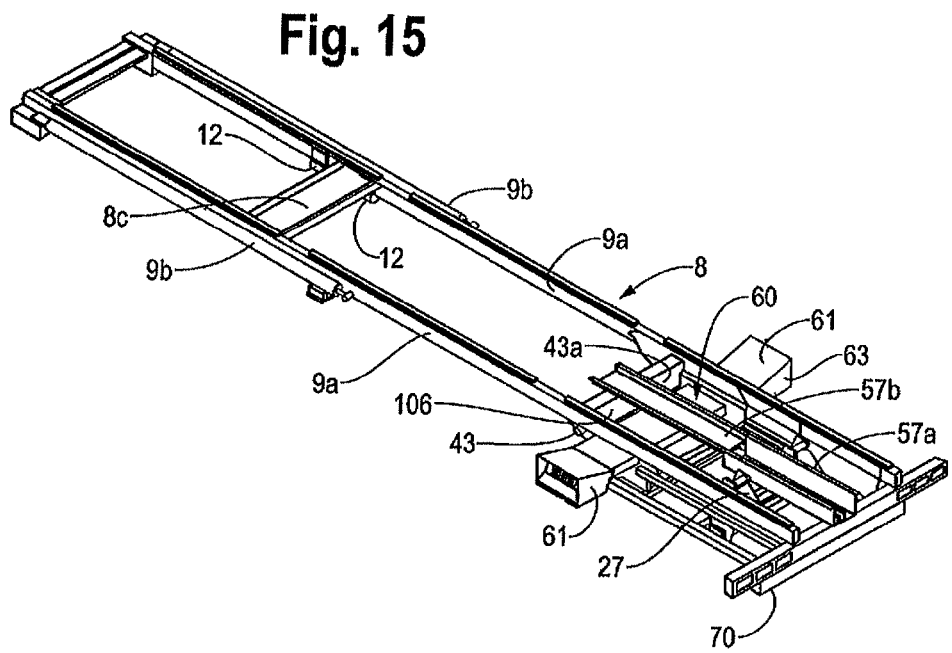
FIG. 15 is a top and side perspective view of a preferred subframe showing a preferred rear hose trough with multiple bays.

Referring to FIG. 2A, winch hydraulic hoses (not shown) may be retained within hose trough 57 located at a forward portion of the subframe. This hose trough location may limit the length of the bed to longer-length beds, however, and may also limit the ability to route electrical cable. Referring to FIGS. 15-16, in a particularly preferred embodiment, it is preferred that a hose trough 57 be located to the rear of the carrier as shown, for example, so that the hose trough will not interfere with the rear tires on beds shorter than 28-feet in length and having a tandem rear axle chassis. Using the embodiment shown in FIGS. 15 and 16A-16D (as opposed to the FIG. 2A embodiment), the bed can be made shorter (industrial carrier beds may vary from about 24-30 feet in length, for example). Rear and front hose trough trays 57a and 57b enable the winch hose lines to move relative to the subframe as the winch and platform move relative to the subframe. Front tray 57a is shallow, to prevent the hoses from sagging and drooping while the bed is in a retracted/forward position. Rear tray 57b is deeper, to account for the hose bend radius. (When the platform is extended, the hoses will lay in the rear tray; when platform is retracted, the hoses will lay in the front tray.) V-shaped dividers 81a, 81b of body plate 81 may be provided, to partition the hoses and wires into three separate bays (bay or partition areas A, B and C in FIG. 16D, for example) and to keep them in a straight path when pushed by extending the platform. Body plate 81 may be rigidly fastened to the platform. When the platform is extended rearwardly, plate 81 moves with the platform. Rear tray 57a may also be provided with inverted dividers 83 and 85, also forming three separate bays between them for carrying hoses and wires. The use of a hose trough with front and rear trays, each having multiple bays, enables the carrying of multiple hose lines, including for example: oil lines for the winch or other hydraulic device; electrical cable for marker lights and/or emergency lighting; and pressurized air lines for, e.g., the air-activated cable tensioner, to disengage and re-engage the winch, or for other purposes.

Referring to FIGS. 16A-16D, the dividers form the separate bays and provide a straight-line path for the hoses and wires as they are rolled and unrolled with the extension and retraction of the platform. Without the dividers, the hoses and wires would not travel in a straight-line path and would become tangled.

Referring back to FIGS. 2, 2A, 2B, and 3-6, a variety of devices may be connected to the rear end of subframe 8. In the drawings, a dock leveling, hydraulic stabilizer 70 is shown to provide strength, crash protection and stability when level-loading from a dock. Stabilizer 70 may be rotated about pivot 71 using hydraulic cylinders 27. The stabilizer may be used to provide support for the bed as a disabled vehicle is loaded on the platform; it may also provide rear-end crash protection. Alternatively, instead of a hydraulic stabilizer, a wheel lift, pintle hitch (for pulling a trailer) or other devices may be attached to the rear end of the subframe.

Those of ordinary skill in the art will understand that a carrier designed according to the principles of the present invention will have a lowered platform height in comparison to conventional carriers in which the subframe is located above the frame rails of the vehicle chassis. This, correspondingly, will result in a reduced loading angle, and an increase in payload height. For example, for a carrier with a 28-feet deck, it was found that a 6-inch drop in the platform/deck height results in about a 1.5° reduction in load angle. Use of an airbag suspension, over a leafspring suspension, lowers the deck height about 2.5 more inches, reducing the load angle about another 0.5° (again, for a 28-foot deck). Thus, the present invention, with a carrier having a 28-foot deck using Super Single rear wheels, an airbag suspension, and a subframe located between the frame rails of the vehicle chassis and the rear wheels, provides a load angle reduction of about 2°.

The above description is not intended to limit the meaning of the words used in the following claims that define the invention. Persons of ordinary skill in the art will understand that a variety of other designs still falling within the scope of the following claims may be envisioned and used. For example, while preferred embodiments involving a slidable and tiltable platform have been disclosed, in other embodiments the platform need not be capable of sliding. As another example, it is possible that future modifications in designs, or future improvements in materials, may enable the use of the invention with dual rear wheels as opposed to Super Single rear wheels (i.e., such design modifications and/or improvements may result in their being sufficient space between the vehicle chassis rails and the dual rear wheels such that the subframe may be located in this space). It is contemplated that future modifications in structure, function, or result will exist that are not substantial changes and that all such insubstantial changes in what is claimed are intended to be covered by the claims.

We claim:

1. A vehicle carrier for loading and unloading disabled vehicles, comprising:
    a motorized truck having an operator compartment and a primary vehicle frame with frame rails and rear wheels;
    a subframe mounted to the vehicle frame of the motorized truck, the subframe:
        (a) comprising a second frame supported by the primary vehicle frame;
        (b) supporting a slidable platform mounted to the subframe which may be used to carry the disabled vehicles, the platform being slidable in a generally horizontal direction relative to the subframe;
        (c) having rails interposed between the frame rails of the primary vehicle frame and the rear wheels; and
        (d) being tiltable relative to the primary vehicle frame; and
    the vehicle frame having a suspension system mounted at least in part outside the vehicle frame rails;
    wherein the interposition of the subframe rails between the vehicle frame rails and the rear wheels enables a lowered platform height and an increase in payload height in comparison to other vehicle carriers whose subframes are located above their frame rails.

2. The carrier of claim 1, wherein the bottom of the subframe rails is located at about the same height as, or below, the top of the primary vehicle frame rails.

3. The carrier of claim 1, wherein the rear wheels comprise a single pair of rear wheels.

4. The carrier of claim 1, wherein the payload height of the vehicle carrier is increased by about 6 inches from that of a carrier having a subframe not located between the primary vehicle frame and the rear wheels.

5. The carrier of claim 1, wherein the carrier utilizes an airbag suspension.

6. The carrier of claim 1, wherein the carrier utilizes a leafspring suspension.

7. The carrier of claim 1, wherein a load angle of the platform is reduced from that of a traditional car carrier by about 2°.

8. The carrier of claim 1, wherein the subframe is tiltable using one or more of a first set of hydraulic cylinders.

9. The carrier of claim 8, wherein the platform is slidable using one or more of a second set of hydraulic cylinders.

10. The carrier of claim 1, further comprising a winch for facilitating loading of a disabled vehicle onto the platform.

11. The carrier of claim 10, wherein hydraulic oil used to hydraulically power the winch is supplied by a pair of hoses carried by one or more hose troughs located at a rear portion of the carrier.

12. The carrier of claim 1, further comprising a hose trough including two or more bays, wherein the bays carry two or more hoses carrying at least one of the following items: oil; electrical wiring; or pressurized air.

13. The carrier of claim 12, wherein the hose trough is located at a rear portion of the carrier.

14. A vehicle carrier for loading and unloading disabled vehicles, comprising:
    a motorized truck having an operator compartment and a primary vehicle frame with frame rails and rear wheels;
    a subframe supported by the primary vehicle frame of the motorized truck, the subframe supporting a platform slidable relative to the subframe which may be used to carry the disabled vehicles, wherein the subframe has rails located between the frame rails of the primary vehicle frame and the rear wheels, and is tiltable relative to the primary vehicle frame; and
    the primary vehicle frame having a suspension system mounted at least in part outside the primary vehicle frame rails;
    whereby the height of the platform is lowered in comparison to other vehicle carriers whose subframe rails are located above their frame rails, thereby enabling an increase in payload height and a reduction in load angle.

15. The carrier of claim 14, wherein the rear wheels comprise a single pair of rear wheels.

16. The carrier of claim 14, wherein the carrier includes rear tandem axles.

17. The carrier of claim 14, wherein the carrier utilizes an airbag suspension.

18. The carrier of claim 14, wherein the carrier utilizes a leaf spring suspension.

19. The carrier of claim 14, wherein a bottom portion of the subframe rails is located at about the same height as, or below, a top portion of the primary vehicle frame rails.

* * * * *